United States Patent [19]

Chornet et al.

[11] Patent Number: 4,761,185
[45] Date of Patent: Aug. 2, 1988

[54] RAPID STARCH DEPOLYMERIZATION VIA SPRAY REACTORS

[75] Inventors: Esteban Chornet; Paulo G. Koeberle, both of Sherbrooke; Ralph Overend, Vanier, all of Canada

[73] Assignee: Universite de Sherbrooke, Sherbrooke, Canada

[21] Appl. No.: 930,570

[22] Filed: Nov. 14, 1986

[51] Int. Cl.[4] .................................................. C13K 1/06
[52] U.S. Cl. ......................................... 127/38; 127/70; 127/71
[58] Field of Search ............... 127/38, 70, 67, 69, 127/71

[56] References Cited

U.S. PATENT DOCUMENTS

| | | | |
|---|---|---|---|
| 1,320,719 | 11/1919 | Stutzke | 127/38 |
| 1,505,696 | 8/1924 | Brindle | 127/38 |
| 1,516,512 | 11/1924 | Stutzke | 127/38 |
| 1,564,979 | 12/1925 | Singer | 127/38 |
| 1,616,171 | 2/1927 | Arsem | 127/38 |
| 1,872,996 | 8/1932 | Mason | 162/22 |
| 1,901,109 | 3/1933 | Maier | 127/38 |
| 1,928,891 | 10/1933 | Hagen | 127/38 |
| 1,990,097 | 2/1935 | Scholler et al. | 127/38 |
| 2,359,763 | 10/1944 | Horesi | 127/38 |
| 2,422,522 | 6/1947 | Beveridge et al. | 162/17 |
| 3,479,248 | 11/1969 | Nobile | 162/16 |
| 3,485,667 | 12/1969 | Maurer | 127/28 |
| 4,070,232 | 1/1978 | Funk | 162/16 |
| 4,137,094 | 1/1979 | Hughes . | |
| 4,155,884 | 5/1979 | Hughes | 127/67 |
| 4,207,139 | 6/1980 | Haikkala et al. . | |
| 4,221,609 | 9/1980 | Hughes . | |
| 4,230,503 | 10/1980 | Hughes . | |
| 4,280,851 | 7/1981 | Pitchon et al. | 127/69 |
| 4,318,748 | 3/1982 | Church . | |

Primary Examiner—Helen M. S. Sneed
Assistant Examiner—Chung K. Pak
Attorney, Agent, or Firm—Cushman, Darby & Cushman

[57] ABSTRACT

The present invention relates to a process for continuous conversion of starch or starch containing materials into hydrolysates such as dextrins, higher sugars, maltose or dextrose. It provides for an extremely fast heating of an acidified or non acidified slurry by spraying it very finely into a chamber containing steam under pressure. The fast heating rate combined with the high operating temperature allow processing times of less than 20 seconds, usually between 1 and 4 seconds during which the starch is converted into the desired hydrolysate without passing through the classical "gelatinized" or "pasted" state. The desired product can be custom tailored from dextrins to glucose, in high yield and low level of degradation products. Moreover, the dextrins so produced have a very uniform molecular weight and the process can handle purified as well as impure starch such as ground corn, cassava and deteriorated harvests.

3 Claims, 2 Drawing Sheets

RAPID STARCH DEPOLYMERIZATION VIA SPRAY REACTORS

BACKGROUND OF THE INVENTION

Two main products are obtained from the hydrolysis of starch: Sweeteners and dextrins.

The first preparation of dextrose in 1811 led to the development of the corn-sugar industry, whose first manufacturing began in 1872 with the industrial production of liquid glucose.

Corn syrups are hydrolysis products of corn starch, containing dextrose, maltose, higher saccharides and water. Corn starch, and for this matter any other starch consists of a chain of D-glucopyranosyl or dextrose units whose number can vary from 250 to over 1000 units per molecule.

Dextrose is the ultimate depolymerization product of starch.

With higher degrees of polymerization there is maltose, composed of 2 units of dextrose, the higher sugars composed of 3 or 4 units, and finally the dextrins with 5 or more units.

The more converted or depolymerized is the starch, the sweeter is the product. Thus, dextrose is the sweetest of all, while dextrins are nearly tasteless.

On the other hand, higher polymerization yields more viscous products. Therefore dextrins are often chosen to impart viscosity or "body" to syrups.

Besides being used as additives for syrup, dextrins are valuable products on their own, being available in more than 100 different blends and used to make a great number of different gums, pastes and adhesives.

Starch depolymerization can be carried out by 2 distinct techniques: Acid hydrolysis and enzymatic hydrolysis respectively.

Corn syrup can be prepared by straight acid conversion, heating an acidified starch-water slurry with steam via a batch method as described by Hagen in U.S. Pat. Nos. 1,927,312, Sept. 19, 1933 and 1,928,891, Oct. 3, 1933. Continuous straight acid conversion methods have been described by Horesi in U.S. Pat. No. 2,359,763, Oct. 10, 1944, Hughes in U.S. Pat. No. 4,221,609, Sept. 9, 1980 and Church in U.S. Pat. No. 4,318,748, Mar. 9, 1982 among others. Corn syrups can also be prepared by enzymatic routes, treating starch with enzymes such as alpha-amylase.

Both methods have their advantages and shortcomings. The acid method is simple, but lacks flexibility, and usually has to compromise between incomplete depolymerization or degradation products. The enzymatic process is more complicated and time consuming. It also has to deal with difficulties in breaking certain chemical linkages and presents the possibility of partial repolymerization, as well as high sensitivity to impurities in the substract.

More commonly, both methods (acid and enzymatic) are combined so that acid pre-hydrolysis is followed to completion by the use of enzymes.

All the actual commercial methods of starch depolymerization by acid hydrolysis contain a step in which an acidified water slurry of starch is heated. During that heating period, the slurry goes through a physical state called "pasted" or "gelatinized" state, therefore acquiring a highly viscous consistence. This usually happens when the process temperature reaches around 80° C. However, the hydrolysis reaction takes place very slowly at this temperature. As it is the case for any chemical reaction, starch hydrolysis can be accelerated dramatically with temperature increase. This is highly desirable because it allows the reaction to be carried out in much smaller reactors, therefore cutting costs and simplifying the whole process. The limit on this downsizing is established by how high temperature can be raised, and this in turn depends on how rapidly the product can be heated and cooled again before degradation can set in.

Once starch is heated to 80° C. and becomes gelatinized, it then becomes difficult to heat rapidly because viscosity suppresses convection currents, which are essential for fast heat transfer.

There are three approaches actually used to attempt circumvention of this problem.

First, there is the option of working at lower temperatures, which is usually the case for batch procedures. It is associated with low mixing speeds and slow heat transfer. The resulting product has an acceptable quality level but the process has the drawbacks of requiring bulky equipment and long retention times. Long retention times are particularly undesirable because they obviously increase the price of a processing plant.

The second option consists of heating the heat transfer surfaces beyond recommendable limits in order to speed-up the reaction. In this case, the reaction rate is increased but the product loses quality due to uneven heating. In fact, uneven temperatures throughout the reactants are objectionable because in acid starch hydrolysis the reaction does not stop when dextrose is produced, but continues towards highly unwanted degradation products. Thus, before all the starch is hydrolysed, part of the finished product will undergo thermal degradation.

Finally, high shear forces can be used to impart forced convection to these "pasted" slurries as described in U.S. Pat. No. 4,221,609 by Hughes, in which an acidified starch slurry is forced with a pump through a pipe system heated from the outside. Such a system allows to work at higher temperatures and to shorten retention times to a few minutes. However, where shear force is used to pump viscous material through a pipe, a laminar flow regime with its inherently parabolic profile of velocities is observed. In other words, material in the central part of the pipe flows faster than material at the periphery, therefore leading the unequal residence times for different parts of the reactants.

In order to overcome these problems, it would be highly desirable to provide a starch depolymerization technique that would allow: elimination of the viscous intermediate state of starch containing slurries, reduction of reaction time from minutes to seconds, reduction of the size and price of equipment, reasonably high operation temperature to allow short residence time but no thermal degradation of the slurry and uniform residence time for all reacting matter passing through the reactor, thus resulting not only in a product possessing superior quality and low production costs, but also greater flexibility by allowing selective production of the needed starch depolymerization product.

SUMMARY OF THE INVENTION

The present invention relates to a rapid process for continuously converting starch containing material to starch hydrolysates which comprises injecting a fine mist of an aqueous suspension of a starch containing product into a steam containing chamber at pressure of from 200 to 1500 psig and a temperature of from 150° to 300° C. for a period of time not exceeding 20 seconds, the injected mist being subjected to a force projecting the mist against the walls of the chamber to cause said mist to flow along the walls, thereby preventing back mixing and favoring uniform residence time distributions for every projected particle and recovering the flowing magma in a lower pressure flashing reservoir while cooling down. Recycle of the steam can be conducted at various points of the process.

It might also be desirable to acidify the suspension of starch containing product prior to its introduction into the steam containing chamber, thus allowing better selectivity of the desired depolymerization product.

DESCRIPTION OF THE INVENTION

With the present invention, it has been discovered that if a non-acidified or a conveniently acidified starch slurry in the form of a spray with particle size in the range of a few microns is dispersed into a vessel containing temperatures above 190° C., the spray mist, once it has reached the reactor wall, which happens very quickly, finds itself at the desired temperature and does no longer present gelatinized characteristics, therefore flowing rapidly out of the reactor.

Since no gel formation is observed, the resulting fluidity of the reacting material allows a precise control of operating conditions such as temperature and residence time providing at the same time means to optimize retention time distribution. Thus, conversion into final product can be achieved in a few seconds.

Sprays with such characteristics can be obtained with ultrasonic nozzles or with centrifugal pressure nozzles, by application of a pressure differential of several hundreds psig for the latter.

The main reactor vessel consists of a chamber having a suitable configuration in order to allow for fast liquid drainage and a suitable construction in order to withstand the operating pressures and temperatures of the process.

The reactor is kept loaded with saturated steam at preestablished working pressures and temperatures by means of a steam control valve. An example of working pressure would be 1000 psig, which corresponds to a temperature of 285° C.

An air purge located on top of the vessel might be useful in purging accumulated air throughout the operation.

The starch or starch containing material to be converted has to be previously mixed with water so as to form a sprayable slurry, having its pH adjusted according to the type of product wanted.

The slurry thus obtained is then pumped into the steam pressurized reactor through one or more suitable spray nozzle in order to form an ultra-fine mist.

Viscosity decrease in the slurry is immediate thus allowing the use of extremely short residence times, which can be close to one second.

The discharge of the reaction vessel can be made either by steam trap or by control valve, preceded or not by a retention time device such as a coil in which plug flow is created either by imparting high velocity to the liquid or by the use of a two phase plug flow.

The present invention discloses great advantages over already existing starch conversion methods, namely rapidity of the conversion as well as improved purity of the products obtained.

With the present invention, acidity, temperature and residence time are three factors that can be easily varied and controlled in order to obtain specific starch products, thus substantially improving product quality.

IN THE DRAWINGS

Figure 1:
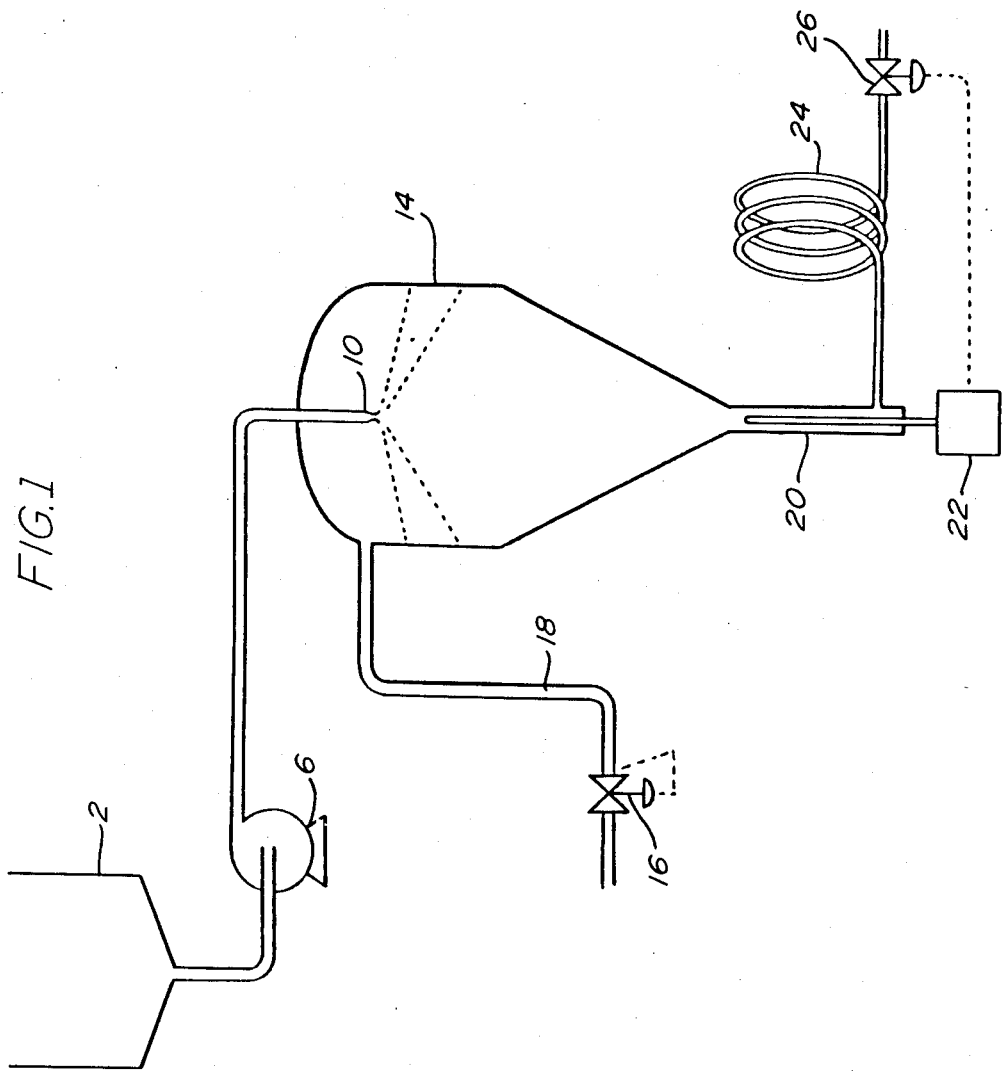
FIG. 1 represents a flow diagram of the starch depolymerization process.
Figure 2:
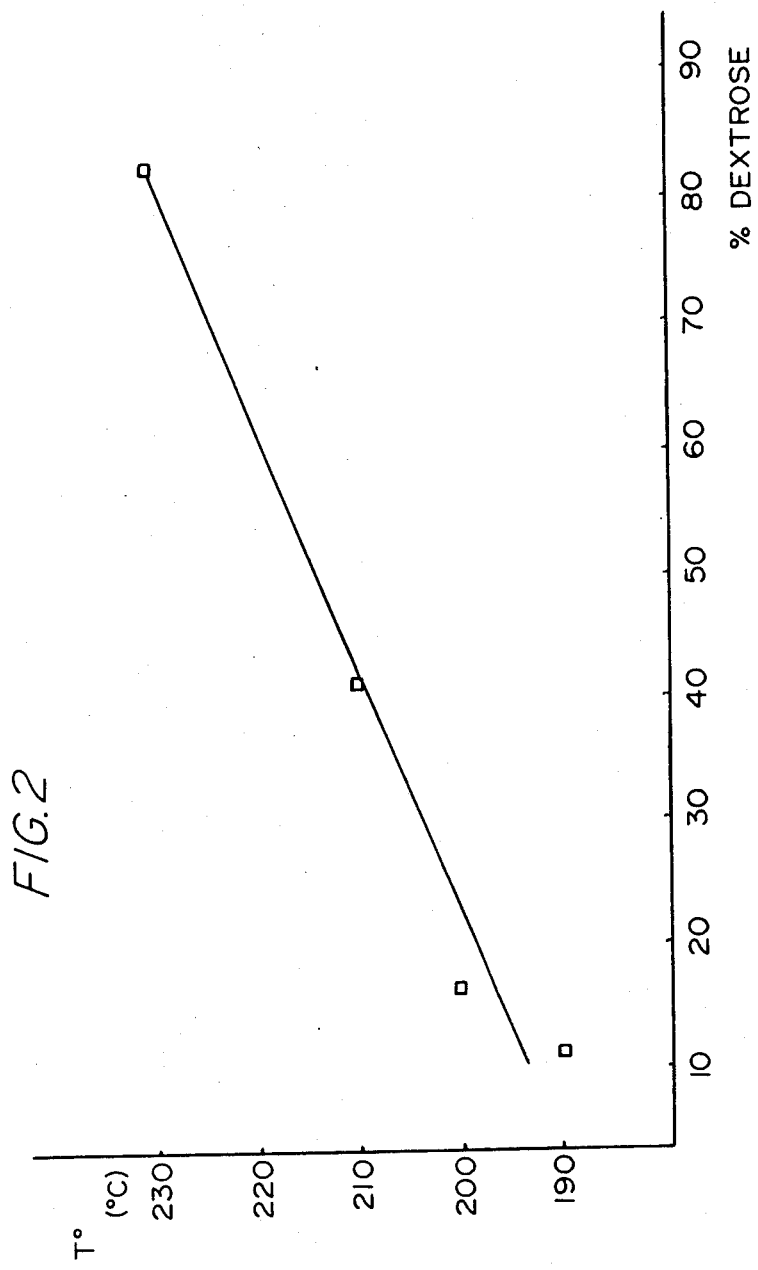
FIG. 2 represents the effect of temperature on starch conversion to dextrose for equal residence times.

Referring now to FIG. 1, the starch containing slurry is prepared, given a consistence so that it can be sprayed and brought to a suitable pH, all these operations being performed in a tank 2. It is to be noted that the pH adjustment could also be done using an inline acid injection.

The slurry is then conveyed from the tank 2 into a pump 6 capable of developing high pressure in order to overcome the steam pressure inside the reactor 14 and also capable of providing enough pressure differential for the nozzle 10 or set of nozzles to function conveniently.

The reactor 14 is kept at working temperature by steam coming through a line 18, said steam flow being regulated by a control valve 16.

The atomized slurry particles, after coming out of the nozzle 10 are directed toward the reactor's wall and flow to the bottom where they can either be discharged immediately through a steam trap, control valve or any other device capable of discharging the liquid while limiting excessive steam loss, into a low pressure level where it flashes or is discharged from the vessel 14 into a retention coil 24 which is usually a high velocity plug flow or similar device, before being flashed at lower pressure using a steam trap, control valve or any discharge device as above.

Moreover, at the bottom of the reactor 14 is housed a level sensor 20 such as a conductivity or capacitance sensor connected to a level controller 22, which actuates a control valve 26, thus discharging liquid so as to keep a constant level inside the narrow part of the reaction chamber consequently providing adequate retention time if necessary.

The discharge control valve 26 relieves the pressure and the existing product therefore flashes bringing the temperature down close to 100° C. if the flashing pressure is the atmospheric pressure or lower if it is performed at a reduced pressure.

The capabilities of the present invention will be more readily understood by referring to the following examples which are given to illustrate rather than limit the scope of the invention.

EXAMPLE 1

This procedure was carried out in an apparatus similar to the one disclosed earlier except for the discharge system (sensor 20, level controller 22, residence coil 24, control valve 26) which was replaced by a single on-off actuated valve connected to a timing device set to sequentially open the valve for 0.6 seconds and close it for 2.0 seconds, which is enough time to allow the discharge of all the starch depolymerization products without discharging appreciable amounts of steam. The reaction chamber in which depolymerization took place had an internal diameter of 102 mm and an internal length of 402 mm. The chamber was saturated with steam and maintained at a temperature of 250° C., corresponding to a gauge pressure of 562 psig.

The starting slurry contained 40.0% of pearl corn starch, 0.3% wt of sulfuric acid and 59.7% wt of water. The material was treated to the above mentioned conditions for 1.3 seconds at a feeding rate of about 600 ml per minute. The reaction product was analyzed and the following results were obtained.

| Insoluble | 1.3 | mw % |
|---|---|---|
| Dextrose | 84.9 | mw % |
| Mannose | 3.9 | mw % |
| Levoglucosan | 7.9 | mw % |
| Maltose | 0.6 | mw % |
| Oligomers from 3 to 7 | 0.0 | mw % |
| Oligomers from 8 and higher | 0.0 | mw % |
| HMF | 1.4% | mw % |

EXAMPLES 2 to 6

The same procedure as in Example 1 was followed except for variations in temperature, pressure and residence time. These experimental variables as well as analytical results for each example are shown in Table 1.

EXAMPLE 7

The same procedure as in Example 1 was followed, the only difference being the starting material which contained 40% out of pearl corn starch, 0.12% out of sulfuric acid and 59.88% of water.

TABLE 1

| EXAMPLE | 2 | 3 | 4 | 5 | 6 |
|---|---|---|---|---|---|
| TEMPERATURE (°C.) | 230 | 210 | 200 | 190 | 190 |
| PRESSURE (PSIG) | 406 | 277 | 211 | 167 | 167 |
| RESIDENCE TIME (SEC) | 1.3 | 1.3 | 1.3 | 1.3 | 16.7 |
| INSOLUBLES (% wt) | 1.2 | 1.8 | 2.0 | 3.0 | 0.0 |
| DEXTROSE (% wt) | 82.8 | 40.8 | 16.5 | 10.5 | 66.1 |
| MANNOSE (% wt) | 5.6 | 2.9 | 4.3 | 0 | 0 |
| LEVOGLUCOSAN (% wt) | 5.6 | 1.6 | 0.0 | 0.0 | 0.0 |
| MALTOSE (% wt) | 3.7 | 18.6 | 8.6 | 86.5 | 33.9 |
| OLIGOMERS FROM 3 to 7 (% wt) | 0.5 | 31.8 | 49.6 | | |
| OLIGOMERS FROM 8 and higher (% wt) | 0.0 | 2.4 | 19.0 | | |
| HMF (% wt) | 0.6 | 0.0 | 0.0 | | |

The following results were obtained.

| Insoluble | 1.7 | mw % |
|---|---|---|
| Dextrose | 21.0 | mw % |
| Mannose | 3.3 | mw % |
| Levoglucosan | 0.7 | mw % |
| Maltose | 11.0 | mw % |
| Oligomers from 3 to 7 | 16.9 | mw % |
| Oligomers from 8 and higher | 45.4 | mw % |
| HMF | 0.0% | mw % |

EXAMPLE 8

The procedure was carried out in an apparatus similar to the one used in Example 1 except for the actuated discharge valve that was replaced by the discharge valves between which was connected a holding tank. The reaction chamber was saturated with steam and maintained at a temperature of 202° C., corresponding to a gauge pressure of 220 psig. The starting starch containing material contained 30% out of finely ground corn starch, 0.35% of sulfuric acid and 69.65% of water. The material was treated at the above mentioned conditions for 1.3 seconds at a feeding rate about 600 ml/min. The following results were obtained.

| Dextrose | 7.4 | mw % |
|---|---|---|
| Maltose | 4.6 | mw % |
| Dextrins | 84.5 | mw % |
| Insoluble starch | 3.2 | mw % |

What is claimed is:

1. A rapid process for continuously converting an aqueous suspension of a starch containing material to starch hydrolysates which comprises injecting a fine mist of said aqueous suspension into a steam containing chamber at a pressure of from 200 to 1500 psig for a period of time not exceeding 20 seconds, said injected mist being projected against the walls of said chamber to cause said mist to flow along the walls of said chamber, thereby preventing back mixing and favoring uniform residence time distribution for the resulting projected mist, thereby producing a non-gelatinized flowing magma and recovering said non-gelatinized magma in a lower pressure flashing reservoir.

2. The process of claim 1, wherein the aqueous suspension of starch containing material is acidified prior to its introduction into the steam containing chamber to recover low molecular weight carbohydrates.

3. The process of claim 1, wherein the aqueous suspension of the starch containing material is constituted of 20 to 60% weight of starch, 0 to 0.50% by weight of sulfuric acid and 40 to 80% by weight of water.

* * * * *